United States Patent

Scheibe

[15] 3,645,362
[45] Feb. 29, 1972

[54] KICKBACK CONTROL AND WEAR ADJUSTMENT MECHANISM FOR DISC BRAKE

[72] Inventor: Elias W. Scheibe, Grand Rapids, Mich.

[73] Assignee: General Motors Corporation, Detroit, Mich.

[22] Filed: May 4, 1970

[21] Appl. No.: 34,445

[52] U.S. Cl. .................. 188/71.8, 60/54.5 S, 188/196 A, 188/351
[51] Int. Cl. ........................................................ F16d 65/52
[58] Field of Search ...................... 188/196 A, 351, 71.8; 60/54.5 S, 54.6 S

[56] References Cited

UNITED STATES PATENTS 2,952,338  9/1960  Oswalt ............................... 188/351
2,961,074  11/1960  Oswalt ........................ 188/196 A X Primary Examiner—George E. A. Halvosa
Attorney—W. E. Finken and D. D. McGraw

[57] ABSTRACT

A disc brake caliper including a valve mechanism communicating with an expansible chamber interposed between the piston and the caliper; the valve mechanism maintaining a residual pressure in the expansible chamber to limit the travel of the piston into the caliper housing following each brake release to compensate for wear and controlling further piston movement into the caliper upon relative movement of the disc and caliper during vehicle cornering.

6 Claims, 3 Drawing Figures

PATENTED FEB 29 1972

3,645,362

INVENTOR.
Elias W. Scheibe
BY
D.D. McGraw
ATTORNEY

KICKBACK CONTROL AND WEAR ADJUSTMENT MECHANISM FOR DISC BRAKE

SPECIFICATION

This invention relates to an improved mechanism for disc brake kickback control and wear compensation. It is desirable in a motor vehicle disc brake to provide a means of adjustment for lining wear and to provide a means for preventing excessive clearance space between the disc and the brake shoe resulting from the relative movement between the caliper and the disc encountered during vehicle cornering.

The present invention is comprised of a modification to a disc brake caliper to include an expansible chamber interposed between the wall of the caliper housing and the wall of the disc brake piston. This expansible chamber communicates to the primary chamber formed by the piston and the caliper housing through a valve assembly including a one-way flow valve and a pressure relief valve. This valve assembly is located in an annular valve body which has one end slidably engaged in a cylindrical bore formed in one wall of the primary chamber and has the other end seated upon the other wall of the primary chamber. The valve body, the valve assembly, and the bore formed in one wall of the primary chamber cooperate to form the expansible chamber. Upon brake application, brake fluid under pressure is communicated from the primary chamber to the expansible chamber through the one-way flow valve thus providing fluid pressure in the expansible chamber essentially equal to that in the primary chamber. Upon brake release, pressure is relieved from the primary chamber and, through the pressure relief valve, from the expansible chamber. The pressure relief valve is constructed to maintain a sufficient residual pressure in the expansible chamber to prevent the piston from retracting into the caliper housing more than enough to provide the necessary clearance. If, upon vehicle cornering or other operating conditions, relative movement between the disc and caliper exerts force on the brake shoe and piston, the pressure relief valve will not permit the piston to travel into the caliper housing until the force exceeds the pressure relief spring. At this point the pressure relief valve opens, draining fluid from the expansible chamber and allowing the piston to retract further into the caliper to prevent brake drag and wear. After each brake application, the piston is retracted the proper amount, thus providing automatic wear adjustment following each brake application.

In the drawings

Figure 1:
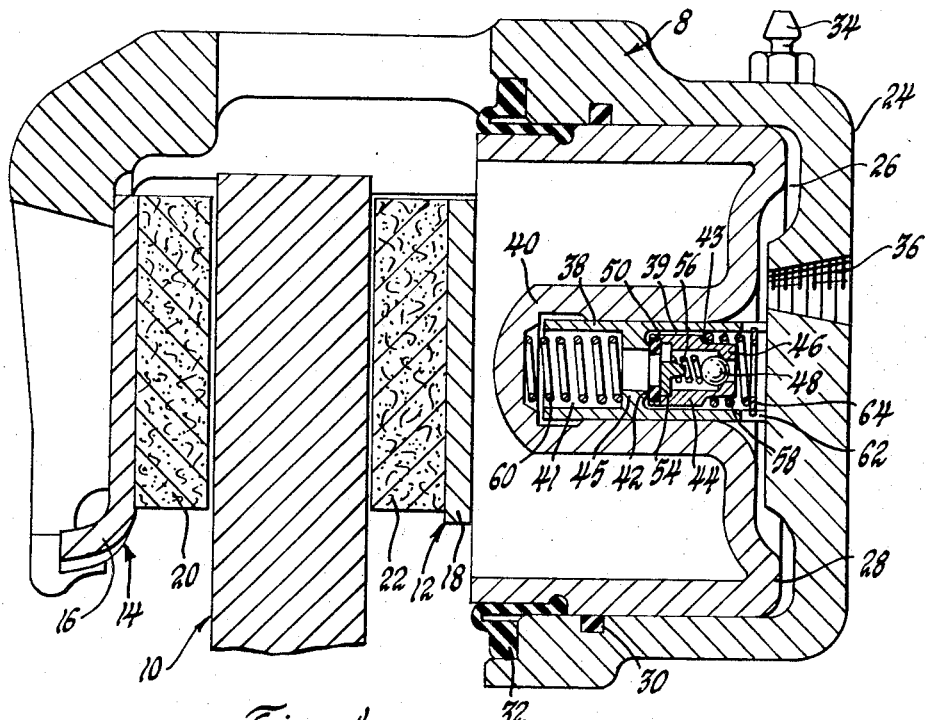
FIG. 1 is a sectional view of a disc brake caliper showing an embodiment of the invention.

The disc brake assembly includes a caliper assembly 8 and a disc 10 which is attached to a vehicle wheel assembly. The inner and outer brakeshoe assemblies 12 and 14 include backing plates 16 and 18 to which are secured suitable brake linings 20 and 22. These shoe assemblies are respectively positioned in the caliper assembly on opposite sides of the disc 10. The caliper housing 24 has formed therein a bore in which the piston 28 is slidable to form the primary chamber 26. The piston 28 engages the brakeshoe assembly 12 so that when chamber 26 is pressurized that shoe assembly moves into braking engagement with the disc 10 and the reaction force transferred through the caliper housing 24 moves the brakeshoe assembly 14 into braking engagement with the other side of the disc. Pressure seal 30 and dust seal 32 are provided between the primary piston 28 and the caliper housing 24. A bleed screw 34 is provided in caliper housing 24. Fluid inlet 36 is connected with a master cylinder assembly by suitable conduit means.

The caliper assembly 8 includes an antikickback and wear adjusting valve mechanism for maintaining the brakeshoes in the desired position in relation to the disc 10. The valve body 38 is slidable in relation to the bore formed in valve housing 40. An expansible chamber 41 is formed between the valve body 38 and the valve housing 40. The valve body 38 has an axially extending bore therethrough forming a valve chamber 39 and having a shoulder formed therein to provide a valve seat 42 facing outward from the expansible chamber 41 and a spring seat 45 facing inward. The annular valve member 44 is located in the internal valve chamber 39 of the valve body 38 and its inner bore is successively stepped down to form three inward-facing shoulders. The innermost of these shoulders forms a seat for valve seal 50, the outermost shoulder provides a seat 46 for the ball 48, and the spring seat 54 is located in the intermediate shoulder. The outer surface of annular valve member 44 is stepped down to form an outward-facing shoulder 43.

In the embodiment shown in FIG. 1, the valve housing 40 is an axially extending chamber formed in the primary piston 28. A spring 60 engages the primary piston 28 and acting against the valve body inner shoulder 45 biases the valve body 38 into engagement with the caliper housing 24. Port 62 provides continuous fluid communication from the primary chamber 26 to the valve chamber 39. The ring 64 engaged in the valve body 38 provides a seat for spring 58 which, acting upon the outer shoulder 43 of the annular valve member 44, biases the valve seal 50 into engagement with valve seat 42.

Upon brake application, brake fluid under pressure is introduced through fluid inlet 36 to the primary chamber 26, displacing piston 28 out of the caliper housing 24 and causing brakeshoe assemblies 12 and 14 to engage disc 10. As piston 28 advances, spring 60 continues to bias valve body 38 against caliper housing 24. The resulting increase in the volume of expansible chamber 41 causes a partial vacuum in the expansible chamber. The resulting pressure differential between the primary chamber 26 and the expansible chamber 41 overcomes spring 56 and lifts ball 48 from seat 46, thereby permitting fluid flow from the primary chamber 26 to the expansible chamber 41.

Upon brake release, fluid is drained from the primary chamber 26 allowing piston 28 to retract into caliper housing 24 withdrawing brakeshoe assemblies 12 and 14 from disc 10. The pressure differential created between the primary chamber 26 and the expansible chamber 41 overcomes the pressure relief valve spring 58 allowing fluid flow between valve seal 50 and valve seat 42. The spring 58 is constructed to maintain a sufficient pressure in the expansible chamber 41 to halt the retraction of piston 28 into the caliper housing 24 at a point where the proper clearances are provided between the brakeshoe assemblies 12 and 14 and the disc 10. In this manner brake lining wear is adjusted following each brake application. If upon cornering or other vehicle operating conditions, the disc 10 moves in relation to the caliper assembly 11, the disc 10 exerts a force against the brakeshoe tending to force piston 28 further into caliper housing 24. Movement of the piston into the caliper housing is resisted until the kickback force applied to the piston results in sufficient pressurization of the fluid in expansible chamber 41 to overcome the pressure relief valve spring 58 allowing fluid to drain into the primary chamber 26 and back into the master cylinder. This evacuation of fluid from the expansible chamber 41 permits the piston 28 to retract into caliper housing 24, thereby preventing excessive brake lining drag on disc 10. Valve body 38 and valve housing 40 are selectively fitted to obviate the necessity of a seal and allow dissipation of the residual pressure from expansible chamber 41 at a controlled rate.

Figure 2:
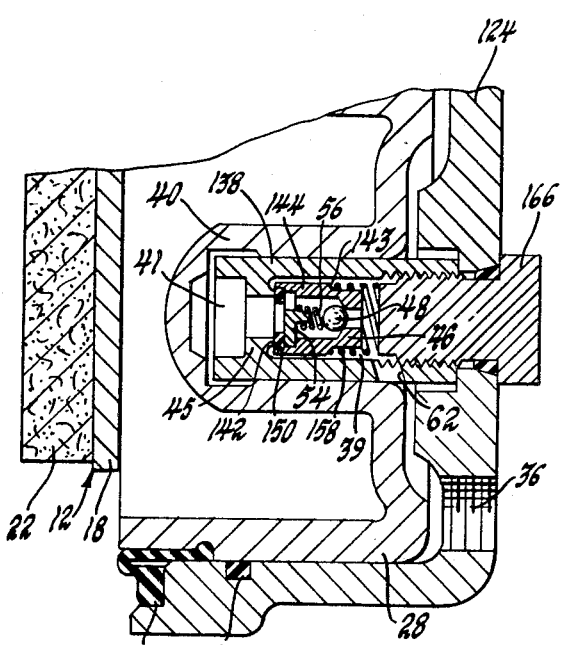
FIG. 2 is a sectional view of a disc brake caliper showing another embodiment of the invention.

FIG. 2 shows a modification of the invention in which valve body 138 is threadedly attached to caliper housing 124 by bolt 166. The bolt 166 provides a seat for spring 158 which acts against the outer shoulder 143 of the annular valve member 144 to bias valve seal 150 into engagement with valve seat 142. Operation of the embodiment shown in FIG. 2 is identical to that of FIG. 1 with the exception that valve body 138 is attached to caliper housing 124 as opposed to being biased by a spring.

Figure 3:
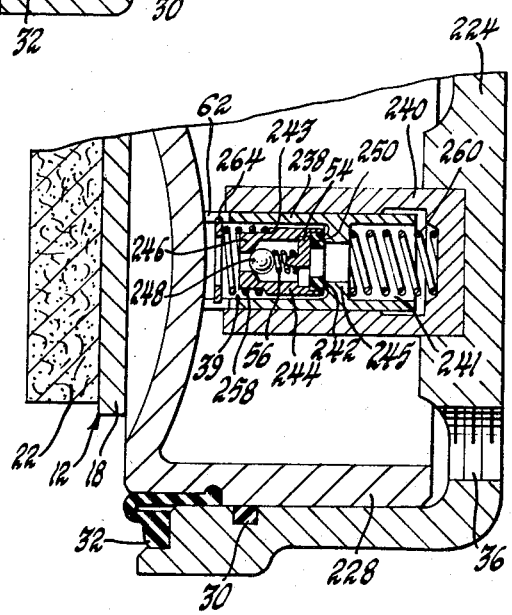
FIG. 3 is a sectional view of a disc brake caliper showing a third embodiment of the invention.

FIG. 3 shows another embodiment of the invention. The valve housing 240 is an axially extending chamber formed in the caliper housing 224. A spring 260 engages the caliper housing 224 and acts against the valve body inner shoulder 245 to bias valve body 238 into engagement with the piston 228. The ring 264 engaged in the valve body 238 provides a seat for spring 258 which acting upon the outer shoulder 243 of annular valve member 244 biases the valve seat 250 into engagement with valve seat 242.

As piston 228 advances out of caliper housing 224 during brake application, spring 260 urges valve body 238 to follow. The pressure differential resulting as the volume of expansible chamber 241 increases, lifts ball 248 off seat 246 permitting fluid to enter the expansible chamber. Upon brake release, the pressure relief valve controls the retraction of the valve body 238 into the caliper housing wall 240, thereby controlling the retraction of piston 238.

Thus, a valve mechanism is provided which prevents excessive disc brake piston kickback and provides for automatic wear adjustment.

What is claimed is:

1. A kickback control wear adjustment mechanism for a disc brake comprising:
   a caliper housing;
   a piston axially movable in said caliper housing, the caliper housing and piston providing walls forming a primary chamber therebetween whereby upon introduction of hydraulic pressure thereto the piston is displaced from the housing and a braking force is applied against a brake lining;
   an axially extending bore formed in one of the walls;
   a valve body slidable in the bore and having an axially extending internal valve chamber therein;
   means holding said valve body in engagement with the other wall of said primary chamber; and
   a valve assembly in said valve chamber forming with the valve body and the one wall of the primary chamber an expansible chamber, said valve assembly including first valve means providing one-way fluid communication from the primary chamber to the expansible chamber during each hydraulic brake actuation and second valve means separate and spaced from said first valve means at least temporarily retaining a residual pressure in said expansible chamber to resist return of said piston into the caliper housing upon release of hydraulic pressure from the primary chamber and effective to relieve the residual pressure upon application of excessive kickback force against the piston.

2. The mechanism of claim 1 further characterized by the valve body being slidably fitted into the bore to allow dissipation of the residual pressure from the expansible chamber at a controlled rate.

3. The valve assembly of claim 1 further comprising:
   the valve body having an outward-facing shoulder therein providing a valve seat, a port through said valve body providing fluid communication between said primary chamber and said internal valve chamber;
   an annular member having an axially extending bore therethrough stepped down at successive stages to form a plurality of inner-facing shoulders and an outer surface stepped down to form an outward-facing shoulder;
   a valve seat on the innermost of the inward-facing shoulders;
   a first spring seat mounted on the intermediate inward-facing shoulder;
   a ball;
   a first spring means engaging said first spring seat and biasing said ball against the outermost inward-facing shoulder of said valve body to form said first valve means, said first spring means being overcome upon brake application by the pressure differential between said primary chamber and said expansible chamber, allowing fluid flow around said ball into said expansible chamber; and
   a second spring means acting against the outward-facing shoulder of said annular member to bias said valve seal against the valve seat of said valve body to form said second valve means, said second spring means being overcome upon brake release or vehicle cornering by pressure differential between said expansible chamber and said primary chamber to control fluid communication from the expansible chamber and thereby control the retraction of said piston into said caliper housing.

4. The mechanism of claim 3 further characterized by;
   the axially extending bore being formed in the piston, spring means acting between the piston and the valve body to hold the valve body in engagement with the caliper housing, and the second spring means acting between the outward-facing shoulder of the annular member and the valve body to bias the valve seal against the valve seat of the valve body.

5. The mechanism of claim 3 further characterized by;
   the axially extending bore being formed in the piston, a bolt extending through the wall of the caliper housing and threadedly attaching the valve body to the caliper housing, and second spring means acting between the bolt and the outward-facing shoulder of the annular member to bias the valve seal against the valve seat of the valve body.

6. The mechanism of claim 3 further characterized by;
   the axially extending bore being formed in the caliper housing, spring means acting between the caliper housing and the valve body to hold the valve body in engagement with the piston, and a second spring means acting between the outward-facing shoulder of the annular member and the caliper housing to bias the valve seal against the valve seat of the valve body.

* * * * *